United States Patent [19]

Ampe et al.

[11] Patent Number: 5,272,391
[45] Date of Patent: Dec. 21, 1993

[54] SYNCHRONIZING CIRCUIT

[75] Inventors: Patrick Ampe, Brugge; Daniel F. J. Van de Pol, Brasschaat; Leon Cloetens, Hasselt, all of Belgium

[73] Assignee: Alcatel N.V., Amsterdam, Netherlands

[21] Appl. No.: 809,933

[22] Filed: Dec. 18, 1991

[30] Foreign Application Priority Data

Dec. 18, 1990 [BE] Belgium ............................. 90203446

[51] Int. Cl.$^5$ ........................... H03K 5/13; H03L 7/00
[52] U.S. Cl. .................................... 307/269; 307/262; 307/527; 328/63; 328/72; 328/155; 375/118
[58] Field of Search ............... 307/527, 262, 269, 603, 307/608; 328/55, 63, 72, 155; 375/106, 111, 118

[56] References Cited

U.S. PATENT DOCUMENTS

| | | | |
|---|---|---|---|
| 4,039,960 | 8/1977 | Clark | 328/155 |
| 4,706,033 | 11/1987 | Robidoux et al. | 328/139 |
| 4,873,703 | 10/1989 | Crandall et al. | 375/118 |
| 4,965,814 | 10/1990 | Yoshida et al. | 375/118 |
| 5,056,120 | 10/1991 | Taniguchi et al. | 375/118 |
| 5,099,477 | 3/1992 | Taniguchi et al. | 328/155 |

FOREIGN PATENT DOCUMENTS

0054322  6/1982  European Pat. Off. .
8909520 10/1989  PCT Int'l Appl. .

Primary Examiner—Timothy P. Callahan
Attorney, Agent, or Firm—Ware, Fressola, Van Der Sluys & Adolphson

[57] ABSTRACT

A synchronizing circuit to synchronize a digital input signal (DIN) with a clock signal (CK1) includes a detection circuit (DC) which checks if a present (SA) sample of a clock signal (CK3) being synchronized with the digital input signal, is equal to the previous (SB) sample, both samples being taken at an interval equal to the period (T) of the clock signal synchronized with the output signal. When the samples differ, the detection circuit generates a phase adjustment signal (CLR), which triggers a phase adjustment circuit (PAC) to ensure a return to synchronism by phase shifting the signal (ES) controlling the sampling of the digital input signal.

25 Claims, 4 Drawing Sheets

SYNCHRONIZING CIRCUIT

BACKGROUND OF THE INVENTION

1. Field of the Invention

The present invention relates to a synchronizing circuit for synchronizing a digital input signal and a clock signal, said circuit including a detection circuit to detect the presence/absence of synchronism between said input signal and said clock signal and to accordingly provide a phase adjustment signal indicative of said presence/absence of synchronism and a phase adjustment circuit controlled by said phase adjustment signal to perform a relative phase shift between said input signal and said clock signal when absence of synchronism is detected and providing an output signal synchronized with said clock signal.

2. Description of the Prior Art

Such a synchronizing circuit is already known in the art, e.g. from the International Patent Application PCT/EP88/00272. In this known synchronizing circuit the detection circuit detects the presence/absence of synchronism between the digital input signal and the clock signal by interpreting the relationship between at least two samples of a regenerated output signal which is obtained by passing the input signal through the phase adjustment circuit comprising a variable delay circuit covering one period of the input signal. This phase adjustment circuit, under the control of the phase adjustment signal generated by the detection circuit, performs a relative phase shift between the regenerated output data signal and the clock signal by adapting the above mentioned variable delay value.

A first drawback of this known synchronizing circuit is that the detection circuit operates directly on the input signal since it successively subjects this input signal to different delays, in a stepwise manner and under control of the phase adjustment signal, to reach synchronism. This means that the time to reach synchronism may be relatively high when many successive delays are necessary, which is another drawback of the existing synchronizing circuit.

Still another drawback is that the samples of the regenerated output have to be taken within half of the period of the input signal and at a very small time interval which implies a complex and accurate delay circuit. Such a delay circuit may be relatively expensive, especially when the synchronizing circuit has to operate at high frequency thus requiring technologies like gallium arsenide.

SUMMARY OF THE INVENTION

A first object of the present invention is to provide a synchronizing circuit of the above type but without operating on the input signal.

According to the invention this object is achieved due to the fact that said detection circuit detects said presence/absence of synchronism between said input signal, which is synchronized with a second clock signal, and the first mentioned clock signal by detecting said presence/absence of synchronism between said first clock signal and a third clock signal which is also synchronized with said second clock signal.

Because the third clock signal is synchronized with the same clock signal as the input signal the detection circuit is able to detect the presence/absence of synchronism between the input signal and the first clock signal by operating on the third clock signal, the input signal remaining unchanged until lack of synchronism is detected.

Another object of the present invention is to provide a synchronizing circuit of the above type without the use of a complex delay circuit and the need for successive delays, thus reducing the time to reach synchronism.

According to the invention this second object is achieved due to the fact that the detection circuit includes a first pulse generator providing a periodic enabling-/disabling first pulse waveform synchronized with the first clock signal for defining sampling enabling and disabling first time intervals;

a first sampling and register means which during the sampling enabling first time intervals and at sampling instants defined by predetermined edges of the first clock signal, samples the third clock signal, thereby providing and registering first sample values;

a second sampling and register means coupled to the first sampling means and which during the sampling enabling first time intervals and at sampling instants defined by predetermined edges of the first clock signal, samples the first sample values, thereby providing and registering second sample values equal to previous first sample values; and gating means to derive from the first and second sample values an error signal indicative of the presence/absence of synchronism between the first and said third clock signals and therefore between the first clock signal and the input signal.

Due to the known form of the third clock signal the detection circuit is aware of the expected relationship of first and second sample values of the third clock signal taken at the same relative instants with respect to the third clock period and may thus detect a presence/absence of synchronism by interpreting this relationship. Therefore, these samples can be taken at intervals equal to $$n \times \frac{T}{2},$$

where n is an integer and T represents the period of the third clock signal and therefore also of the input signal. As a consequence, there is no need for a complex delay circuit as in the known synchronizing circuit to take samples within T/2 and with a very small interval to detect lack of synchronism. When lack of synchronism is detected, a relative phase shift, under control of the phase adjustment signal, between the input signal and the first clock signal ensures return to synchronism in one step thus avoiding successive delays and reducing the time needed to reach this synchronism.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIGS. 4(a)-(p) show pulse waveforms on a common time line appearing at various points of the circuit of FIG. 1 in case of synchronism;

FIGS. 5(a)-(p) represents pulse waveforms on a common time line appearing at various points of the circuit of FIG. 1 in case of lack of synchronism.

DETAILED DESCRIPTION OF THE PREFERRED EMBODIMENT

Figure 4:
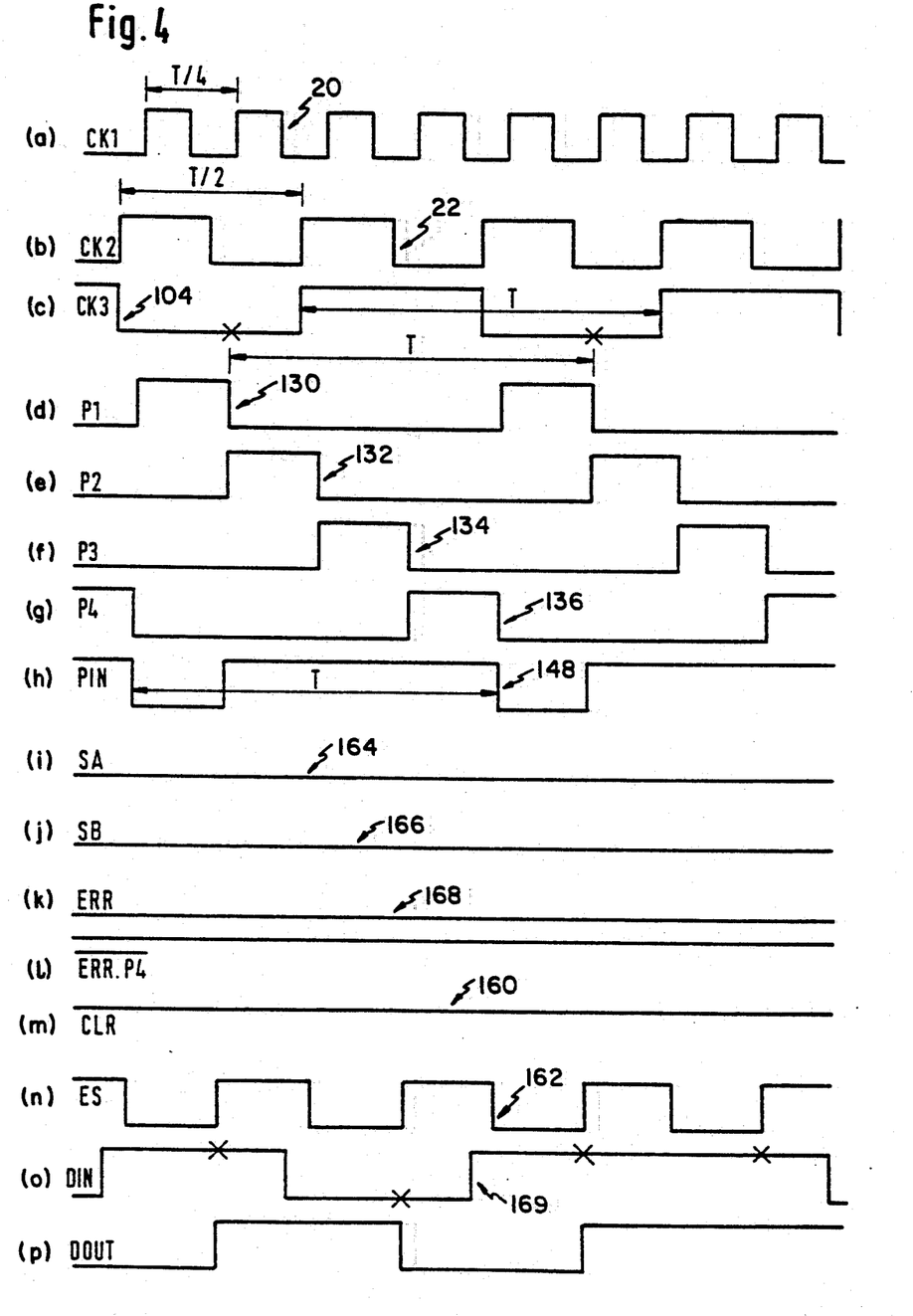
Figure 5:
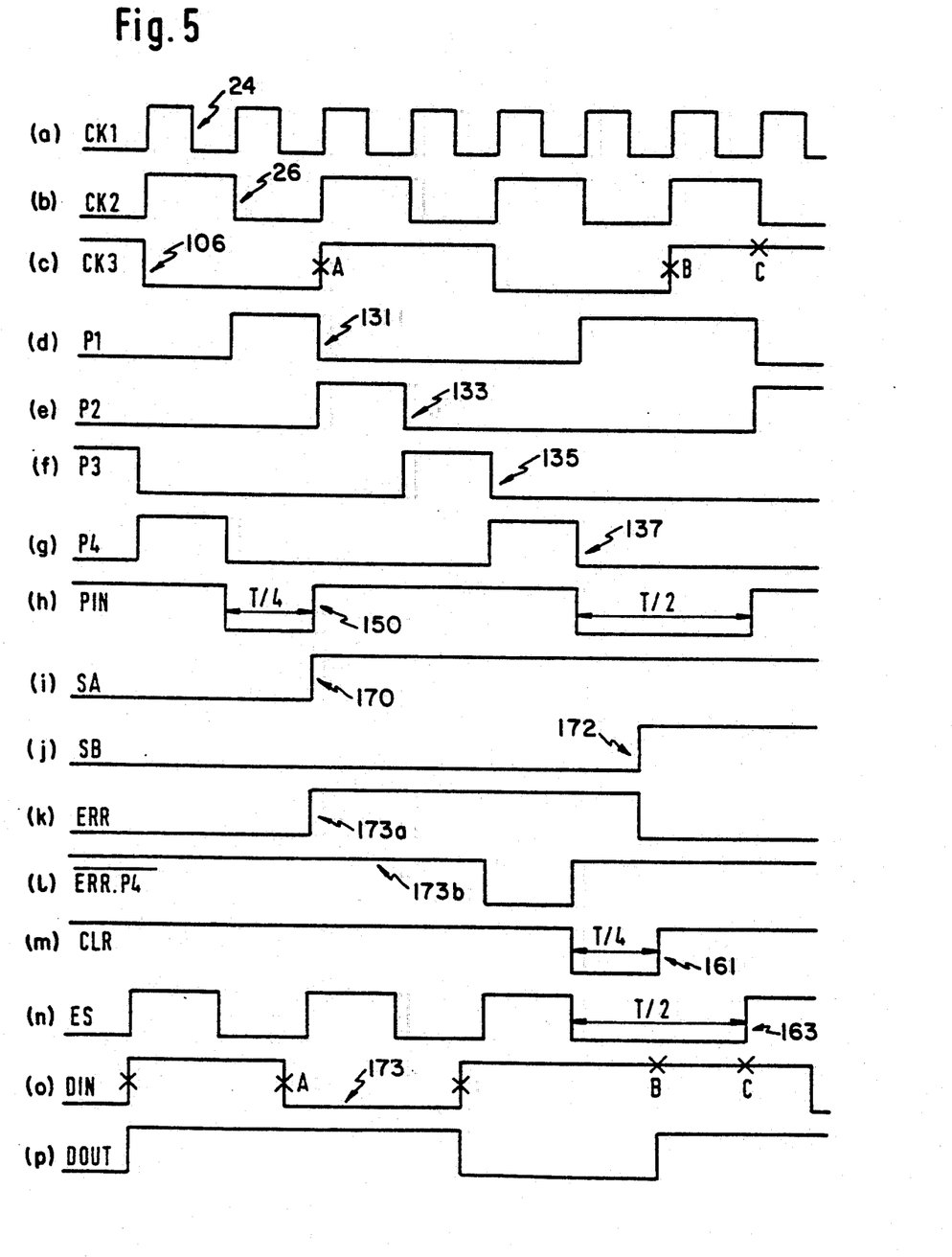

It has to be kept in mind, when looking at FIGS. 4 and 5, that a first signal derived from a second signal always has a small time delay with respect to the second one due to the technology used to perform this derivation. However, in order to simplify these figures the delays have not been represented, but should be taken into account to identify "the next or first rising edge" whenever specified in the following description.

Figure 1:
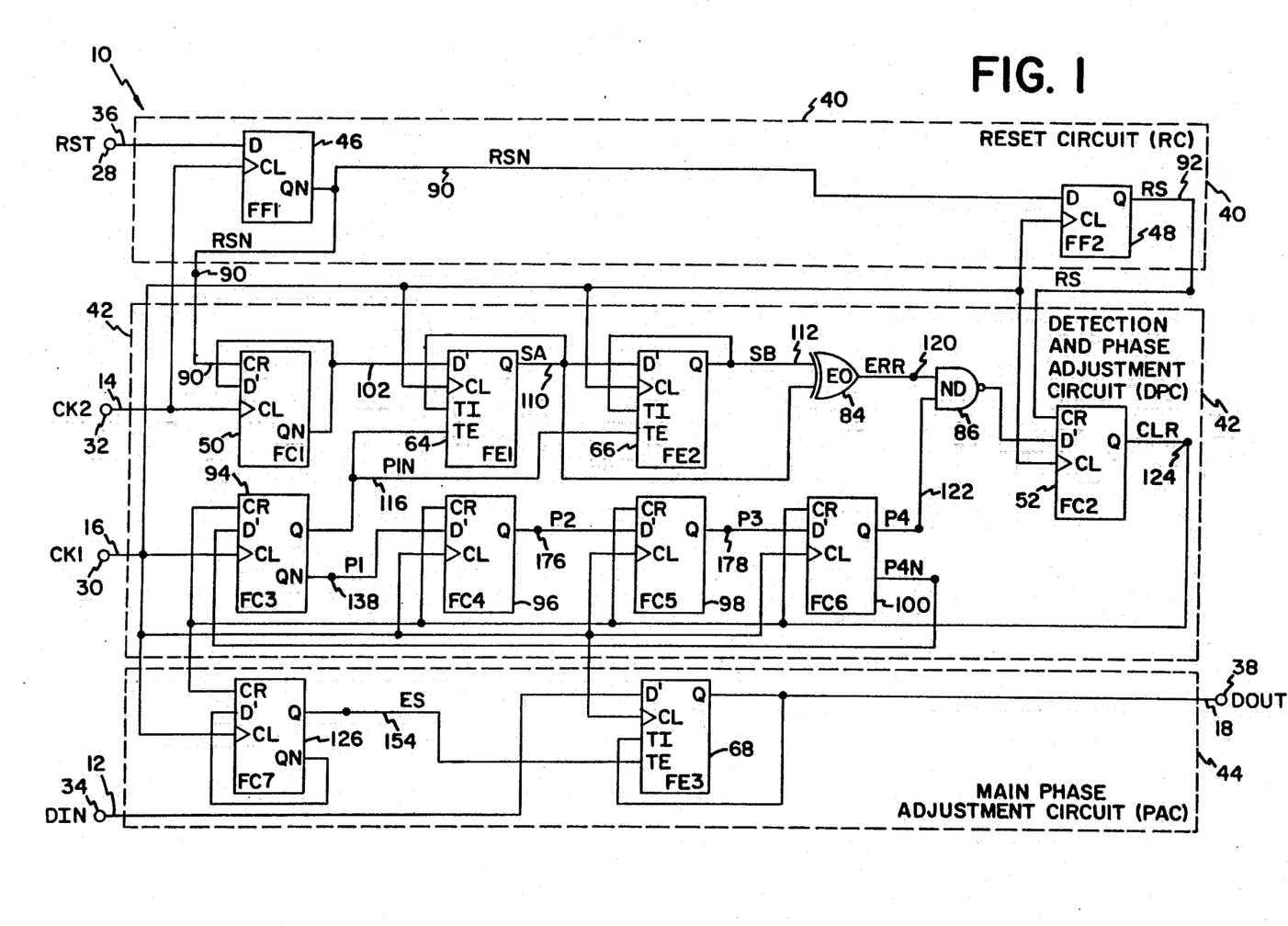
FIG. 1 represents a synchronizing circuit (SC) according to the invention.

A synchronizing circuit (SC) 10 shown in FIG. 1 is used in a BroadBand Integrated Services Digital Network (BBISDN) (not shown), and more particularly at the transmit side of a receiver/transmitter (not shown). Therein, a received input digital data stream (DIN) on a line 12 organized as byte data and synchronized with a 75 MHz clock signal (CK2) on a line 14 is first synchronized with a 150 MHz clock signal (CK1) on a line 16 and a resultant synchronized data DOUT signal on a line 18 is multiplexed afterwards to an output digital data stream organized as 4-bit data at the frequency of and synchronized with clock signal CK1. CK1 and CK2 shown as waveforms 20, 22 in FIGS. 4(a) and (b) and 5(a) and (b) have a period equal to T/4 and T/2 respectively, as shown in FIGS. 4(a) and 4(b).

The circuit 10 has reset input terminal (RST) 28, clock input terminal CK1 30, clock input terminal CK2 32 and data input terminal (DIN) 34 to which a reset input signal (RST) on a line 36, the clock signal CK1 on the line 16, the clock signal CK2 on the line 14 and the input signal DIN on the line 12 are applied respectively, and a data output terminal DOUT 38 on which the output data stream DOUT on the line 18 is generated. The synchronizing circuit 10 comprises a reset circuit (RC) 40, a detection and auxiliary phase adjustment circuit (DPC) 42 and a main phase adjustment circuit (PAC) 44.

Figure 2:
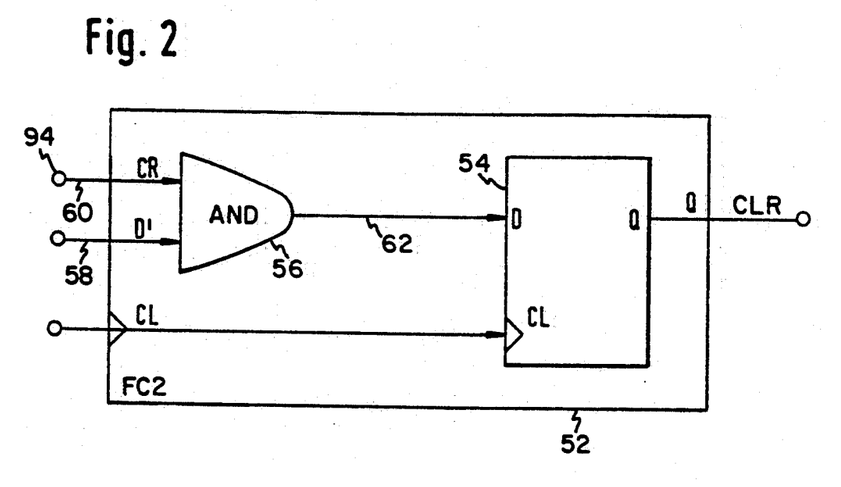
FIG. 2 shows D-flipflop FC2 of FIG. 1 in more detail.
Figure 3:
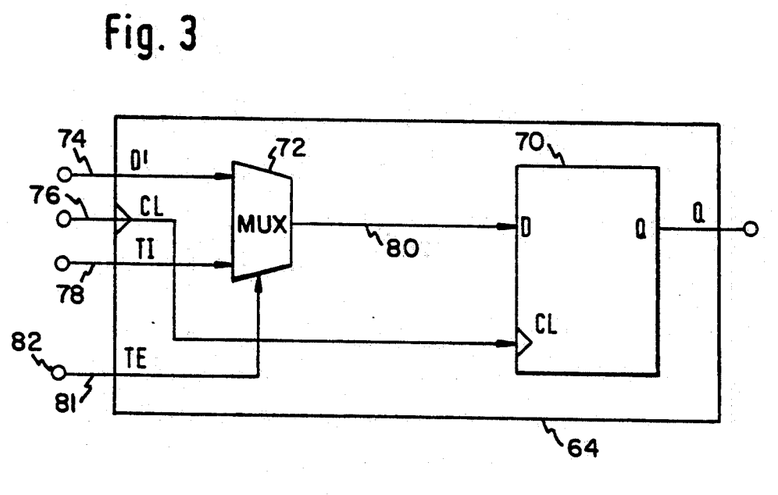
FIG. 3 represents D-flipflop FE1 of FIG. 1 in more detail.

The circuit 10 includes the following circuitry:

A pair of D-flipflops 46, 48, labeled FF1, FF2, respectively, each with a data input D, a clock input CL, a Q-output and a QN-output;

D-flipflops 50, 52 with a clear port, labeled FC1 and FC2 respectively, of which only FC2 is shown in detail in FIG. 2. Such a D-flipflop comprises a D-flipflop 54 proper and an AND gate 56. The inputs of the gate 56 are constituted by a data input D' signal on a line 58 and a control input signal (CR) on a line 60, and its output on a line 62 is connected to the data input D of the D-flipflop 54 proper;

D-flipflops 64, 66, 68 with an internal multiplexer labeled FE1 to FE3, respectively, where only flipflop 64 (FE1) is represented in detail in FIG. 3. Such a D-flipflop comprises a D-flipflop 70 proper and a two input/one output multiplexer 72. This multiplexer 72 has a data signal input (D') on a line 74, a data input TI on a line 76, a selection input TE on a line 78, and an output on a line 80 which is connected to the data input D of the D-flipflop 70 proper. Depending on the value of the selection signal on a line 81 applied to a (TE) port 82 being low or high, either the signal on the line 74 applied to the D' port or the signal on line 78 applied to the TI port is fed on the line 80 to the input port (D) of the D-flipflop 70 proper;

an exclusive-OR gate (EO) 84; and a NAND gate (ND) 86.

The reset circuit RC includes the D-flipflop 46 (FF1) of which the D-input and the clock input CL are connected to the reset input terminal 28 (RST) and to the clock input terminal 32 (CK2), respectively. The QN-output provides a signal on a line 90 (RSN) of FF1 flipflop 46 and is connected to the input CR of flipflop 50 (FC1) as well as to the D input of D-flipflop 48 (FF2) which is controlled by the CK1 signal on the line 16. The Q-output of FF2 provides the signal (RS) on the line 60 to a CR input port 94 of the FC2 flipflop 52.

The detection and auxiliary phase adjustment circuit 42 (DPC) includes D-flipflops 50, 52, 94, 96, 98, 100, respectively labeled FC1 to FC6, and includes flipflops 64 and 66, respectively labeled FE1 and FE2, exclusive-OR gate 84 (EO) and NAND gate 86 (ND).

The clock input terminal 32 (CK2) is connected to the clock input CL of flipflop 50 (FC1), whose QN-output provides a signal CK3 on a line 102 which is fed back to its data input D'. Flipflop 50 (FC1) is a pulse generator generating a clock signal on the line 102 (CK3) having half the frequency of the input signal (CK2) on line 14, as shown by waveforms 104, 106, respectively in FIGS. 4 and 5. Since the clock signal CK3 on the line 102 and the input signal on the line 90 are both synchronized with the clock signal CK2 on the line 14, the presence/absence of synchronism between the signal DIN on the line 23 and the signal CK1 on the line 16 can be detected by detecting the presence/absence of synchronism between the CK3 signal on the line 102 and the CK1 signal on the line 16. In other words, the clock signal CK3 on the line 102 is representative of the state of synchronism of the input signal DIN on the line 12.

The QN output signal CK3 of flipflop 50 (FC1) on the line 102 is also connected to the D' input of the FE1 flipflop 64 whose Q output provides an SA signal on a line 110 which is likewise connected to the D' input of the FE2 flipflop 66 having a Q-output signal SB on a line 112. Flipflops 64, 66 (FE1 and FE2) are connected in a similar way since their Q-outputs SA, SB on lines 110, 112 are fed back to their inputs TI, their clock inputs CL are connected to clock input terminal 30 (CK1), and their selection input TE is connected to the Q-output signal (P1N) on a line 116 from flipflop 94 (FC3). Flipflops 64, 66 (FE1 and FE2) constitute first and second sampling and register circuits able to sample the CK3 signal on the line 102 and the SA signal on the line 110, respectively, at sampling instants defined by the rising edges of the clock signal CK1 on the line 16 and during sampling enabling or low time intervals defined by the sampling enabling/disabling pulse waveform P1N on the line 116 generated at the Q-output P1N of flipflop 94 (FC3).

The Q-output signals SA and SB on lines 110 and 112 are connected to respective inputs of the exclusive-OR (EO) gate 84 which constitutes an error detection circuit. It provides an output signal (ERR) on a line 120 and the Q-output on a line 122 (P4) of flipflop 100 (FC6) are connected to the D' input of flipflop 52 (FC2), the clock input CL of which is connected to clock input terminal 30 (CK1). Flipflop 52 (FC2) is a register used to memorize the error signal generated by gate 84 (EO)

and which provides on its Q-output a phase adjustment signal CLR. The latter output CLR on the line 124 is connected to the clear inputs CR of flipflops 94, 96, 98, 100 (FC3 to FC6) and of a flipflop 126 (FC7) to control phase adjustment.

The four D-flipflops 94, 96, 98, 100 (FC3 to FC6) are connected in cascade and in a closed loop so as to form a 4-stage closed loop shift register with a shift input controlled by the CK1 signal on the line 16. A phase inversion takes place between flipflops 94 and 96 (FC3 and FC4) as well as between flipflops 100 and 94 (FC6 and FC3), since the QN-output of flipflop 94 (FC3) and flipflop 100 (FC6) are connected to the D'-input of flipflop 96 (FC4) and flipflop 94 (FC3), respectively. This four-stage shift register constitutes a pulse generator generating the pulse waveforms 130 (P1) and 132, 134, 136 (P2, P3, P4) (FIG. 4) as a signal (P1) on a line 138 at a QN-output of flipflop 94 (FC3) and as signals (P2, P3 and P4) on lines 140, 142, 146 at Q-outputs of flipflops 96, 98, 100 (FC4, FC5 and FC6), respectively. It further generates the above-mentioned sampling enabling/disabling pulse, as shown by a waveform 148 (PIN) in FIG. 4 and a waveform 150 in FIG. 5, at the Q-output of flipflop 94 (FC3). Hereby the low time intervals constitute the enabling time interval and have a repetition period equal to T.

The main phase adjustment circuit (PAC) 44 comprises D-flipflops 126 and 68 (FC7 and FC3). Flipflop 126 (FC7) is connected in a similar way as flipflop 50 (FC1), except that it is connected to the CK1 terminal 30 instead of the CK2 terminal 32 for flipflop 52 (FC2). Flipflop 126 (FC7) therefore constitutes a pulse generator generating a signal ES on a line 154 at its Q-output which has half the frequency of the CK1 signal on the line 16 and therefore at the frequency of the CK2 signal on the line 14. The signal ES on the line 154 is another sampling enabling/disabling signal defining sampling enabling (low) and disabling (high) time intervals.

Flipflop 68 (FE3) is connected in a similar way as flipflops 64 and 66 (FE1 and FE2) and therefore also constitutes a sampling and register circuit. More particularly, its inputs D', CL, TI and TE are connected to the data input terminal 34 (DIN), the clock input terminal 30 (CK1), its Q-output signal (DOUT) on the line 18, and the Q-output signal (ES) on the line 154 of flipflop 126 (FC7), respectively. Flipflop 68 (FC3) samples the DIN signal on the line 12 at sampling instants defined by rising edges of the clock signal CK1 on the line 16 and during sampling enabling or low time intervals defined by the sampling enabling/disabling signal ES on the line 154. It provides the output data signal DOUT on the line 18 at its output terminal 38 (DOUT).

The above synchronizing circuit operates as described hereafter.

Reference is made to FIG. 4, where it is assumed that no lack of synchronism is detected, and to FIG. 5, where a lack thereof is detected. The waveforms in FIGS. 4 and 5 are labeled with alpha-numeric identifiers which are the same as those in FIG. 1. A "low" condition is signified by the alpha-numeric above the waveform, and a "high" condition by the alpha-numeric below the waveform.

When the reset (RST) signal on the line 36 applied to the input terminal 28 of the reset circuit 40 is high, the latter circuit produces at the next rising edge of the CK2 signal on the line 14 a low reset signal RSN on the line 90 at the QN-output of flipflop 46. The RSN signal on the line 90, being synchronized with the CK2 signal on the line 14, gives rise to a high output signal at the QN-output of the pulse generator flipflop 50 (FC1) thus starting the operation thereof. Flipflop 50 (FC1) thereby produces the clock waveform 104, 106 (CK3) as the CK3 signal on the line 102 at its QN-output, as shown by waveforms 104, 106.

The signal RSN on the line 90 is also applied to the D-input of flipflop 48 (FF2) which at its Q-output produces the reset signal RS on the line 92 synchronized with the CK1 signal on the line 16. This signal RS on line 92 is supplied to the clear port of flipflop 52 (FC2) which accordingly generates a low phase adjustment signal CLR on the line 124 at its Q-output CLR, as shown in FIG. 4(m) as a waveform 160 and in FIG. 5(m) as a waveform 161. The latter signal CLR on line 124 resets at the same time both the pulse generators 94-100 (FC3-FC6) and 126 (FC7) which then start their operation and produce the waveforms 130 to 136 in FIGS. 4(d-g) (P1 to P4), waveform 148 in FIG. 4(h) (P1N) and an ES waveform 162 in FIG. 4(n) at respective outputs. The corresponding waveforms in FIG. 5 are waveforms 131–137 (P1–P4) in FIGS. 5(d–g), waveform 150 (P1N) in FIG. 5(h) and waveform 163 in FIG. 5(n). As already mentioned above, the low intervals of the P1N waveforms 148, 150 and the ES waveform 162, 163 are sampling enabling time intervals.

During each of the sampling enabling time intervals of the P1N waveforms 148, 150 and at a sampling instant defined by the first rising edge of the CK1 waveforms 20, 24 occurring within that interval, the CK3 clock signal on the line 102 is sampled and registered by flipflop 64 (FE1), thereby producing a new sample value SA on the line 110, as shown by the waveforms 164, 170 in FIGS. 4(i) and 5(i), and simultaneously the sample value SA of the immediately preceding sampling operation which occurred a time T ago is sampled and registered by flipflop 66 (FE2), thereby producing a new sample value on the SB signal line 112, as shown by waveforms 166, 172 in FIGS. 4(j) and 5(j), equal to the previous sample value SA on line 110. In other words, during each sampling operation, two sample values of the CK3 signal on line 102, at a period distance equal to T, are obtained.

During the low time intervals of the gating waveforms 136, 137 (P4), the output signal of the gate 86 (ND) is high so that at the occurrence of each rising edge of the CK1 waveforms 20, 24, it is registered in the flipflop 52 (FC2), thereby producing a high output signal CLR on the line 124 at the Q-output thereof. This signal CLR on line 124 has no effect either on flipflops 94-100 (FC3-FC6) or flipflop 126 (FC7).

When, as assumed in FIG. 4, no phase shifting has occurred between two successive sampling instants separated by the time interval T, both the above sampled values are equal so that the error signal ERR on line 120 provided at the output of gate EO then remains low, as shown by a waveform 168 in FIG. 4(k). As a consequence, nothing is changed to the condition of the output signal CLR on line 124 after the signal ERR on the line 120 has been gated through gate 86 (ND) under the control of a high pulse of the P4 signal on the line 122, as shown by the P4 waveform 136 of FIG. 4(g).

In a similar way as for flipflop 64 (FE1), but now during the low intervals provided by the ES signal on line 154 and as shown by the waveforms 162 and 163 of FIGS. 4 and 5, and thus at twice the frequency of the P1N signal on the line 116, as shown by waveforms 148 and 150 of FIGS. 4 and 5, again at sampling instants defined by the rising edges of the CK1 signal on line 16 occurring within these intervals, the input signal DIN on the line 12 is sampled by the FE3 flipflop 68, thereby producing a sample data output signal DOUT on the line 18 at its Q-output. Since the frequency of the sampling enabling signal ES is equal to the frequency of CK2, with which DIN is synchronized, the sample data output signal DOUT on the line 18 represents the input signal DIN on the line 12, but now synchronized with the CK1 signal on the line 16.

Since the clock signal CK3 on the line 102 is representative for the input signal DIN on the line 12, and since, for the case represented in FIG. 4, there is no need for a relative phase adjustment between the CK3 and CK1 signals, there is also no need for a relative phase adjustment between the DIN and CK1 signals.

Reference is now made to FIG. 5 for the operation of the circuit in case a lack of synchronism is detected.

Such a lack of synchronism between the input signal DIN synchronized with CK2 and the clock signal CK1 is reflected in a lack of synchronism between the clock signal CK3 and the clock signal CK1, since both the DIN and CK3 signals are synchronized with CK2.

In FIG. 5 a lack of synchronism occurs because both the CK3 and DIN signals are sampled in the neighborhood of an edge marked A on waveform 106 in FIG. 5(c) and on a waveform 173 in FIG. 5(o). As a consequence the new sampling value SA provided by FE1 becomes high, as shown by the waveform 170 in FIG. 5(i), whereas the new sample value SB which is equal to the previous sample value SA is still low, as shown in waveform 172 in FIG. 5(j). Accordingly, the gate EO provides a high error signal ERR, as shown by a waveform 173a, and the latter is registered in the flipflop register 52 (FC2) under the control of a high pulse of the signal P4 and via the gate ND, as shown by a waveform 173b in FIG. 5(l). The Q-output CLR of this register thus becomes low during a time interval of duration T/4 and following the high pulse of P4, as shown by the waveform 161 of FIG. 5(m).

This pulse is fed to the clear input CR of both FC3 and FC7, at the beginning of an enabling or low period of the enabling/disabling pulse waveforms and will force the latter again to a low period at the next rising edge of CK1 at a time marked B on waveforms 106 and 173 in FIGS. 5(c) and 5(o), respectively. This means that the enabling or low period of the enabling/disabling pulse waveforms 150, 163 is extended from T/4 to T/2 towards the right so that during the extended enabling or low interval of the P1N and ES signals CK3 and DIN signals on lines 102 and 12, respectively, are sampled not only in the sampling instants B but also in the sampling instants C, as shown in FIGS. 5(c) and 5(o). Since the error was due to a sampling operation at sampling instants A in the neighborhood of an edge of the CK3 and DIN signals, it is clear that the sampling operation at sampling instant C takes place in the neighborhood of the middle between two such edges. In this way a return to synchronism is ensured. Flipflops 96, 98, 100 (FC4 to FC6) receive the CLR signal on the line 124 on their clear input CR at the same instant as the FC3 flipflop 94, thus keeping their output signals P2 to P4 low. So, the 4-phase shifter is restarted at such an instant as to provide output signals P1N, P1 to P4 on lines 116, 138, 176, 178, 122 respectively, shifted over T/4 to the right ensuring a sampling of the CK3 signal during the enabling or low period of the P1N signal in the neighborhood of the middle between two edges of the CK3 signal, implying a relative phase shift between the sampled third clock (CK3) signal and the first clock (CK1) signal.

In a similar way, flipflop 126 (FC7) is restarted and its output signal ES on the line 154 is shifted over T/4 to the right. This results in a relative phase shift between the regenerated DIN signal and the CK1 signal, thus synchronizing DIN and CK1.

While the principles of the invention have been described above in connection with specific apparatus, it is to be clearly understood that this description is made only by way of example and not as a limitation on the scope of the invention.

What is claimed is:

1. Synchronizing circuit for synchronizing a digital input signal (DIN) and a clock signal (CK1), said circuit including a detection circuit (DPC) to detect the presence/absence of synchronism between said input signal (DIN) and said clock signal (CK1) and to accordingly provide a phase adjustment signal (CLR) indicative of said presence/absence of synchronism and a phase adjustment circuit (PAC) controlled by said phase adjustment signal (CLR) to perform a relative phase shift between said input signal (DIN) and said clock signal (CK1) when absence of synchronism is detected and providing an output signal (DOUT) synchronized with said clock signal (CK1), wherein said detection circuit detects said presence/absence of synchronism between said input signal (DIN), which is synchronized with a second clock signal (CK2) that is input to said detection circuit, and the first mentioned clock signal (CK1) by detecting said presence/absence of synchronism between said first clock signal (CK1) and a third clock signal (CK3) which is provided by a third clock generating device (FC1) in said detection circuit (DPC) in response to said second clock signal and which is also synchronized with said second clock signal (CK2) wherein said detection circuit (DPC) also includes a first pulse generator (FC3-FC6) providing a periodic enabling/disabling first pulse waveform (P1N) synchronized with said first clock signal (CK1) and defining sampling enabling and disabling first time intervals;

a first sampling and register means (FE1) which during said sampling enabling first time intervals and at sampling instants defined by predetermined edges of said first clock signal (CK1) samples said third clock signal (CK3), thereby providing and registering first sample values (SA);

a second sampling and register means (FE2) coupled with said first sampling means and which during said sampling enabling first time intervals and at sampling instants defined by predetermined edges of said first clock signal (CK1) samples said first sample values (SA), thereby providing and registering second sample values (SB) equal to previous first sample values; and gating means (EO) to derive from said first (SA) and second (SB) sample values an error signal (ERR) indicative of said presence/absence of synchronism between said first (CK1) and said third (CK3) clock signals and therefore between said first clock signal (CK1) and said input signal (DIN).

2. Synchronizing circuit according to claim 1, wherein said detection circuit (DPC) comprises an auxiliary phase adjustment circuit for providing said phase adjustment signal (CLR) for effecting a relative phase shift between said first clock signal (CK1) and said third clock signal (CK3).

3. Synchronizing circuit according to claim 1, wherein the interval between consecutive sampling instants is equal to a multiple of half the period of said third clock signal (CK3).

4. Synchronizing circuit according to claim 1, wherein said detection circuit (DPC) includes a first register means (ND-FC2) to register said error signal (ERR) and to provide at its output said phase adjustment signal (CLR).

5. Synchronizing circuit according to claim 4, wherein said first pulse generator (FC3-FC6) also provides a gating signal (P4) allowing said error signal (ERR) to be registered in said first register means (ND-FC2) through a logic gate (ND) whose output is coupled with a first D-flipflop (FC2) controlled by said first clock signal (CK1) and provides said phase adjustment signal (CLR) at its output (Q).

6. Synchronizing circuit according to claim 5, wherein said phase adjustment signal controls an input of the first AND gate associated to said first stage which provides said periodic enabling/disabling first pulse waveform at its non-inverted output and that said gating signal is provided at the non-inverting output of said last stage of said first pulse generator.

7. Synchronizing circuit according to claim 1, wherein said detection circuit (DPC) is able under the control of said phase adjustment signal (CLR) to phase shift said enabling first time intervals over the duration thereof and such that the first of these phase shifted enabling first time intervals covers two consecutive first and second sampling instants, whilst the other phase shifted enabling first time intervals each cover only a second sampling instant.

8. Synchronizing circuit according to claim 7, wherein said phase adjustment signal controls an input of the first AND gate associated to said first stage which provides said periodic enabling/disabling first pulse waveform at its non-inverted output and that said gating signal is provided at the non-inverting output of said last stage of said first pulse generator.

9. Synchronizing circuit according to claim 1, wherein the frequency of said first clock signal (CK1) is equal to twice the frequency of said second clock signal CK2, and that said first pulse generator is constituted by a closed loop four-stage shift register (FC3-FC6) with a shift input controlled by said first clock signal (CK1) and having first (FC3) and last (FC6) stages wherein signal inversion is performed, each of said stages (FC3-FC6) including a first AND gate coupled with the data input of a D-flipflop.

10. Synchronizing circuit according to claim 9, wherein said phase adjustment signal (CLR) controls an input of the first AND gate associated to said first stage which provides said periodic enabling/disabling first pulse waveform (P1N) at its non-inverted output (Q) and that said gating signal (P4) is provided at the non-inverting output of said last stage (FL6) of said first pulse generator.

11. Synchronizing circuit according to claim 1, wherein said first sampling and register means consists of a two input/one output multiplexer with a first input to which said first sample values (SA) are applied, with a second input to which said third clock signal (CK3) is fed with a a selection input controlled by said first pulse waveform (P1N) and with an output coupled with a D-flipflop controlled by said first clock signal (CK1).

12. Synchronizing circuit according to claim 1, wherein said second sampling and register means consists of a two input/one output multiplexer with a first input to which said second sample values (SB) are applied, with a second input to which said first sample values (SA) are fed with a selection input controlled by said first pulse waveform (P1N) and with an output coupled with a D-flipflop controlled by said first clock signal (CK1).

13. Synchronizing circuit according to claim 1, wherein said auxiliary phase adjustment circuit is able under the control of said phase adjustment signal to phase shift said enabling first time intervals over the duration thereof and such that the first of these phase shifted enabling first time intervals covers two consecutive first and second sampling instants, while the other phase shifted enabling first time intervals each cover only a second sampling instant.

14. The synchronous circuit of claim 1, wherein said third clock signal (CK3) has a frequency less than that of said second clock signal (CK2) which in turn has a frequency less than said first clock signal (CK1).

15. The synchronizing circuit of claim 1, wherein said third clock signal (CK3) has a frequency half that of said second clock signal (CK2) which in turn has a frequency half that of said first clock signal (CK1).

16. Synchronizing circuit for synchronizing a digital input signal (DIN) and a clock signal (CK1), said circuit including a detection circuit (DPC) to detect the presence/absence of synchronism between said input signal (DIN) and said clock signal (CK1) and to accordingly provide a phase adjustment signal (CLR) indicative of said presence/absence of synchronism and a phase adjustment circuit (PAC) controlled by said phase adjustment signal (CLR) to perform a relative phase shift between said input signal (DIN) and said clock signal (CK1) when absence of synchronism is detected and providing an output signal (DOUT) synchronized with said clock signal (CK1), wherein said detection circuit detects said presence/absence of synchronism between said input signal (DIN), which is synchronized with a second clock signal (CK2) that is input to said detection circuit, and the first mentioned clock signal (CK1) by detecting said presence/absence of synchronism between said first clock signal (CK1) and a third clock signal (CK3) which is provided by a third clock generating device (FC1) in said detection circuit (DPC) in response to said second clock signal and which is also synchronized with said second clock signal (CK2) wherein said phase adjustment circuit (PAC) includes a second pulse generator (FC7) for providing a periodic enabling/disabling second pulse waveform (ES) synchronized with said first clock (CK1) and defining sampling enabling and disabling second intervals and a third sampling and register circuit (FE3) which during said sampling enabling second intervals (ES) and at sampling instants defined by predetermined edges of said first clock signal (CK1) samples said input signal (DIN), thereby providing and registering said output signal (DOUT) synchronized with said first clock signal.

17. Synchronizing circuit according to claim 16, wherein said phase adjustment circuit (DPC) is able under the control of said phase adjustment signal to phase shift said enabling second time interval over the duration thereof and such that the first of these phase shifted enabling second time intervals covers two consecutive first and second sampling instants, whilst the other phase shifted enabling second time intervals each cover only a second sampling instant.

18. Synchronizing circuit according to claim 16 wherein the frequency of said first clock signal (CK1) is equal to twice the frequency of said second clock signal (CK2) and that said second pulse generator is constituted by an oscillator circuit (FC7) comprising a second AND gate coupled with the data input of a D-flipflop and controlled by said first clock signal (CK1), said phase adjustment signal (CLR) being applied to an input of said AND gate.

19. Synchronizing circuit according to claim 16, wherein said third sampling circuit (FE3) comprises a two input/one output multiplexer with a first input to which said output signal (DOUT) is applied, with a second input to which said input signal (DIN) is fed with a selection input controlled by said second pulse waveform (ES) and with an output coupled with a D-flipflop controlled by said first clock signal (CK1).

20. Synchronizing circuit according to claim 16, wherein said detection circuit (DPC) comprises an auxiliary phase adjustment circuit for providing said phase adjustment signal (CLR) for effecting a relative phase shift between said first clock signal (CK1) and said third clock signal (CK3).

21. The synchronizing circuit of claim 16, wherein said third clock signal (CK3) has a frequency less than that of said second clock signal (CK2) which in turn has a frequency less than said first clock signal (CK1).

22. The synchronizing circuit of claim 16, wherein said third clock signal (CK3) has a frequency half that of said second clock signal (CK2) which in turn has a frequency half that of said first clock signal (CK1).

23. A synchronizing circuit for synchronizing a digital input signal having a full period (T) with a local clock signal, comprising:
- a detection circuit, responsive to said local clock signal having a quarter period (T/4) or multiple thereof and to a second clock signal having a half period (T/2) or multiple thereof in synchronism with said digital input signal, for providing a third clock signal having the full period (T) or multiple thereof for providing a phase adjustment signal and wherein said detection circuit is responsive to said phase adjustment signal and to said local clock signal for providing a periodic sampling enabling signal (PIN) for enabling sampling of: (a) said third clock signal at selected edges of said local clock signal for providing a first sample value signal (SA), and (b) said first sample value signal (SA) at selected edges of said local clock signal for providing a second sampled value signal (SB) and wherein said detection circuit compares said first and second sampled value signals for providing said phase adjustment signal; and
- a phase adjustment circuit, responsive to said local clock signal, to said phase adjustment signal and to said digital input signal having the full period (T), for providing said digital input signal as a digital output signal having said full period in synchronism with said local clock signal.

24. The synchronizing circuit of claim 23, wherein said phase adjustment circuit comprises:
- a third pulse generator (FC7), responsive to said clock signal and said phase adjustment signal, for providing a second sampling enabling-disabling signal (ES) at a frequency half that of the clock signal; and
- a third sampling register (FE3), responsive to said second sampling enabling-disabling signal, said clock signal and said digital input signal, for providing said digital output signal.

25. A synchronizing circuit (SC) for synchronizing a digital input signal (DIN) with a clock signal (CK1), comprising:
- a detection circuit (DPC), responsive to said clock signal and to a second clock signal (CK2) in synchronism with said digital input signal, for providing a phase adjustment signal (CLR); and
- a phase adjustment circuit (PAC), responsive to said clock signal, to said phase adjustment signal and to said digital input signal, for providing said digital input signal as a digital output signal (DOUT) in synchronism with said clock signal;
wherein said detection circuit comprises:
- a first pulse generator (FC3-FC6), responsive to said clock signal and to said phase adjustment signal, for providing a periodic enabling-disabling first pulse signal (PIN) and a second pulse signal (P4);
- a second pulse generator (FC1), responsive to said second clock signal, for providing a third clock signal (CK3) at a frequency one-half that of said second clock signal;
- a first sampling register (FE1), responsive to said clock signal, said third clock signal and said first pulse signal, for providing a first sample value signal (SA);
- a second sampling register (FE2), responsive to said first sample value signal, said clock signal and said first pulse signal, for providing a second sample value signal (SB);
- first gating means (EO), responsive to said first and second sample value signals, for providing an error signal (ERR) having a magnitude indicative of the presence or absence of synchronism between said clock signal and said third clock signal and therefore also between said clock signal and said input signal;
- second gating means (ND), responsive to said error signal and to said second pulse signal, for providing a gated error signal (ERR.P4); and
- an error memory register (FC2), responsive to said gated error signal and said clock signal, for providing said phase adjustment signal.

* * * * *